United States Patent
Seenappa et al.

(10) Patent No.: US 10,372,478 B2
(45) Date of Patent: *Aug. 6, 2019

(54) USING DIVERSITY TO PROVIDE REDUNDANCY OF VIRTUAL MACHINES

(71) Applicant: AT&T Intellectual Property I, L.P., Atlanta, GA (US)

(72) Inventors: Vikram Seenappa, Sammamish, WA (US); Vivek Mhatre, Bellevue, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/632,456

(22) Filed: Jun. 26, 2017

(65) Prior Publication Data
US 2017/0293538 A1 Oct. 12, 2017

Related U.S. Application Data

(63) Continuation of application No. 14/684,411, filed on Apr. 12, 2015, now Pat. No. 9,690,613.

(51) Int. Cl.
*G06F 9/455* (2018.01)
*G06F 11/07* (2006.01)
(Continued)

(52) U.S. Cl.
CPC ...... *G06F 9/45558* (2013.01); *G06F 11/0712* (2013.01); *G06F 11/14* (2013.01);
(Continued)

(58) Field of Classification Search
CPC ............. G06F 9/45533; G06F 9/45558; G06F 11/0712; G06F 2009/45562; G06F 2009/4557; G06F 2009/45591
(Continued)

(56) References Cited

U.S. PATENT DOCUMENTS 8,015,432 B1 9/2011 Vaidya
8,190,740 B2 5/2012 Stienhans et al.
(Continued)

OTHER PUBLICATIONS

"VMware vCloud Architecting a vCloud," Technical White Paper, 2010, VMware, Inc.
(Continued)

*Primary Examiner* — Joseph R Kudirka
(74) *Attorney, Agent, or Firm* — Hartman & Citrin LLC

(57) ABSTRACT

Concepts and technologies are disclosed herein for using diversity to provide redundancy of virtual machines. A server computer that executes an orchestrator application can receive a virtual machine instantiation request. The server computer can analyze the request to determine needs associated with a virtual machine (including a redundancy requirement). The server computer can obtain resource availability data that indicates availability of resources and includes diversity data used to provide diversity-based redundancy of the virtual machine. The server computer can identify a pool of resources and identify, among the pool, two or more resources. The two or more resources can include a most diverse group of resources of the pool of resources and can be identified based upon the diversity data. The server computer can trigger instantiation of the virtual machine and a copy of the virtual machine on the resources.

20 Claims, 5 Drawing Sheets

(51) Int. Cl.
    *G06F 11/14*    (2006.01)
    *H04L 12/24*    (2006.01)
(52) U.S. Cl.
    CPC ...... *H04L 41/0654* (2013.01); *H04L 41/0806* (2013.01); *G06F 2009/45591* (2013.01); *G06F 2009/45595* (2013.01)
(58) Field of Classification Search
    USPC .......................................................... 718/1
    See application file for complete search history.

(56) References Cited

U.S. PATENT DOCUMENTS

| 8,775,282 | B1 | 7/2014 | Ward, Jr. et al. |
| 8,843,624 | B2 | 9/2014 | Britsch et al. |
| 8,849,971 | B2 | 9/2014 | Ferris |
| 8,862,933 | B2 | 10/2014 | Manglik et al. |
| 9,246,996 | B1 | 1/2016 | Brooker |
| 2009/0199177 | A1 | 8/2009 | Edwards |
| 2011/0004791 | A1 | 1/2011 | Kokubu |
| 2011/0219372 | A1 | 9/2011 | Agrawal et al. |
| 2013/0152076 | A1 | 6/2013 | Patel |
| 2013/0326053 | A1 | 12/2013 | Bauer et al. |
| 2014/0157261 | A1 | 6/2014 | Toeroe |
| 2014/0237111 | A1 | 8/2014 | McMurry et al. |
| 2014/0282528 | A1 | 9/2014 | Bugenhagen |
| 2014/0304398 | A1 | 10/2014 | Carlen et al. |
| 2014/0365662 | A1 | 12/2014 | Dave |

OTHER PUBLICATIONS

Machida et al., "Redundant Virtual Machine Placement for Fault-tolerant Consolidated Server Clusters," 2010 IEEE/IFIP Network Operations and Management Symposium—NOMS 2010.
Hyser et al.; "Autonomic Virtual Machine Placement in the Data Center;" HP Laboratories; Feb. 26, 2008; pp. 1-10.
U.S. Office Action dated Oct. 3, 2016 in U.S. Appl. No. 14/684,411.
U.S. Notice of Allowance dated Feb. 10, 2017 in U.S. Appl. No. 14/684,411.
U.S. Notice of Allowance dated May 17, 2017 in U.S. Appl. No. 14/684,411.

USING DIVERSITY TO PROVIDE REDUNDANCY OF VIRTUAL MACHINES

CROSS-REFERENCE TO RELATED APPLICATIONS

This application is a continuation of and claims priority to U.S. patent application Ser. No. 14/684,411, entitled "Using Diversity to Provide Redundancy of Virtual Machines," filed Apr. 12, 2015, now U.S. Pat. No. 9,690,613, which is incorporated herein by reference in its entirety.

BACKGROUND

Recently, there has been a move toward virtualization of certain types of network functionality such as applications, services, and the like. In some virtualized networks, common off the shelf ("COTS") hardware can be used to host virtual machines that can execute software to provide functionality associated with certain applications or services. Thus, specialized hardware and software can be replaced by generic hardware that can execute specialized software modules.

In some approaches to virtualization, DNS and load balancers may be used to provide for fault tolerance. In particular, several instances of virtual machines may run behind a load balancer (or load balancers). Thus, if one virtual machine fails or is compromised, the overall service may not be impacted drastically as redundant copies of the virtual machine may exist. This approach may require that each virtual machine may need its own redundant virtual machine image or backup virtual machine image to provide the desired level of fault tolerance.

Providing several instances of virtual machines behind a load balancer and/or providing DNS-based redundancy for virtual machines may not always be practical (or even possible) at the component level. Thus, some virtualized services or applications may not provide tolerance to failures and/or faults and therefore may be susceptible to catastrophic failures in certain circumstances.

SUMMARY

The present disclosure is directed to using diversity to provide redundancy of virtual machines. In some embodiments, a server computer can execute an orchestrator application. The server computer can receive a virtual machine instantiation request from a requestor and analyze the virtual machine request. Based upon the analysis, the server computer can determine a number of virtual machines that are needed or desired for a particular purpose or need. The number can correspond to the virtual machine requested and a number of redundant copies of the virtual machine needed or desired to satisfy a redundancy requirement. The server computer can analyze resource availability data obtained from a resource monitor or other resource to identify a pool of resources that are capable of hosting the requested number of virtual machines. Once the pool of capable resources is identified by the orchestrator application, the orchestrator application can analyze diversity information included in the resource availability data to identify, among the pool of resources, the most diverse resources available. After identifying the most diverse resources that can host the virtual machines and/or redundant copies of the virtual machines, the orchestrator application can instantiate the instances of the virtual machines across the identified resources. Some embodiments of the concepts and technologies described herein improve fault tolerance of systems to one or more virtual machine failures by increasing diversity of compute environments over which the original copy of a virtual machine and its redundant copy/copies run.

The concepts and technologies described herein also can be used to monitor the diverse set of virtual machines after instantiation and to take action if a virtual machine fails. In particular, in some embodiments of the concepts and technologies described herein, the orchestrator application can be configured to detect a failure of a virtual machine (or a redundant copy thereof). The orchestrator application can determine if the virtual machine should be replaced or repaired. If the orchestrator application determines that the virtual machine should be repaired (or determines that the virtual machine should not be replaced), the orchestrator application can repair the virtual machine. If the orchestrator application determines that the virtual machine should be replaced, the orchestrator application can determine if enhanced redundancy should be provided.

In the event that the orchestrator application determines that enhanced redundancy should not be provided, the orchestrator application can determine that only the failed virtual machine should be replaced. If the orchestrator application determines that enhanced redundancy should be provided, the orchestrator application can determine a number of extra virtual machines that should be instantiated to provide the enhanced redundancy of the remaining active virtual machines. The orchestrator application can identify a pool of resources that are capable of providing the needs of the virtual machines and again identify the most diverse resources available. In identifying the most diverse resources, the orchestrator application can measure diversity relative to the remaining original set of virtual machines that are still active and the new resources identified for the new extra virtual machines. After identifying the new resources that are the most diverse from the existing set of resources that host the remaining virtual machines, the orchestrator application can instantiate instances of the virtual machines across the resources.

According to one aspect of the concepts and technologies disclosed herein, a method is disclosed. The method can include receiving, at a server computer that executes an orchestrator application, a virtual machine instantiation request from a requestor. The method also can include analyzing, by the server computer, the request to determine needs associated with a virtual machine. In some embodiments, the needs can include a redundancy requirement. The method also can include obtaining, by the server computer, resource availability data that indicates availability of resources and includes diversity data that is used to provide diversity-based redundancy of the virtual machine. The method also can include identifying, by the server computer, a pool of resources capable of providing the needs associated with the virtual machine and identifying, by the server computer, two or more resources of the pool of resources. The two or more resources can include a most diverse group of resources of the pool of resources, and the two or more resources can be identified based upon the diversity data. The method also can include triggering, by the server computer, instantiation of the virtual machine and a copy of the virtual machine on the two or more resources.

In some embodiments, the diversity data includes data selected from a group of data that includes server/router/switch hardware vendor and/or model information, geographic location information, building information, rack information, row information, and power feed information. In some embodiments, the resource availability data can be provided by a resource monitor that monitors the resources. In some embodiments, the resource availability data can be provided by the resources. In some embodiments, triggering the instantiation can include issuing, by the server computer, two or more commands to the two or more resources. The two or more commands can cause the two or more resources to instantiate the two or more virtual machines.

The method also can include detecting a failure of one of the two or more virtual machines, determining that a failed virtual machine should be replaced, determining that enhanced redundancy is to be provided for the failed virtual machine, determining a number of new virtual machines to be instantiated to provide the enhanced redundancy, identifying a further pool of resources that are capable of providing the needs associated with the new virtual machines, identifying a further two or more resources of the further pool of resources, where the further two or more resources includes a most diverse group of the further pool of resources, and triggering instantiation of the new virtual machines on the further two or more resources. In some embodiments, the method also can include detecting a failure of one of the two or more virtual machines, determining that a failed virtual machine should not be replaced, and repairing the failed virtual machine. In some embodiments, the method also can include detecting a failure of one of the two or more virtual machines; determining that a failed virtual machine should be replaced; determining that enhanced redundancy is not to be provided for the failed virtual machine; and replacing the failed virtual machine with a single new virtual machine. In some embodiments, the two or more resources can be located at a single data center. In some embodiments, the two or more resources can be located at two or more data centers.

According to another aspect of the concepts and technologies disclosed herein, a system is disclosed. The system can include a processor and a memory. The memory can store computer-executable instructions that, when executed by the processor, cause the processor to perform operations. The operations can include receiving a virtual machine instantiation request from a requestor; analyzing the request to determine needs associated with a virtual machine, the needs including a redundancy requirement; obtaining resource availability data that indicates availability of resources and includes diversity data that is used to provide diversity-based redundancy of the virtual machine; identifying a pool of resources capable of providing the needs associated with the virtual machine; identifying two or more resources of the pool of resources, where the two or more resources include a most diverse group of resources of the pool of resources and where the two or more resources can be identified based upon the diversity data, and triggering instantiation of the virtual machine and a copy of the virtual machine on the two or more resources.

In some embodiments, the diversity data can include data selected from a group of data that can include geographic location information, rack information, row information, server/router/switch hardware vendor and/or model information, and power feed information. In some embodiments, the computer-executable instructions, when executed by the processor, can cause the processor to perform operations further including detecting a failure of one of the two or more virtual machines; determining that a failed virtual machine should not be replaced; and repairing the failed virtual machine. In some embodiments, the computer-executable instructions, when executed by the processor, can cause the processor to perform operations further including detecting a failure of one of the two or more virtual machines; determining that a failed virtual machine should be replaced; determining that enhanced redundancy is not to be provided for the failed virtual machine; and replacing the failed virtual machine with a single new virtual machine.

In some embodiments, the computer-executable instructions, when executed by the processor, can cause the processor to perform operations further including detecting a failure of one of the two or more virtual machines; determining that a failed virtual machine should be replaced; determining that enhanced redundancy is to be provided for the failed virtual machine; determining a number of new virtual machines to be instantiated to provide the enhanced redundancy; identifying a further pool of resources that are capable of providing the needs associated with the new virtual machines; identifying a further two or more resources of the further pool of resources, where the further two or more resources can include a most diverse group of the further pool of resources; and triggering instantiation of the new virtual machines on the further two or more resources.

According to yet another aspect of the concepts and technologies disclosed herein, a computer storage medium is disclosed. The computer storage medium can have computer-executable instructions stored thereon. When the computer-executable instructions are executed by a processor, the processor can perform operations. The operations can include receiving a virtual machine instantiation request from a requestor; analyzing the request to determine needs associated with a virtual machine, the needs including a redundancy requirement; obtaining resource availability data that indicates availability of resources and includes diversity data that is used to provide diversity-based redundancy of the virtual machine; identifying a pool of resources capable of providing the needs associated with the virtual machine; identifying two or more resources of the pool of resources, where the two or more resources include a most diverse group of resources of the pool of resources and where the two or more resources can be identified based upon the diversity data, and triggering instantiation of the virtual machine and a copy of the virtual machine on the two or more resources.

In some embodiments, the diversity data can include data selected from a group of data that can include geographic location information, rack information, row information, server/router/switch hardware vendor and/or model information, and power feed information. In some embodiments, the computer-executable instructions, when executed by the processor, can cause the processor to perform operations further including detecting a failure of one of the two or more virtual machines; determining that a failed virtual machine should not be replaced; and repairing the failed virtual machine. In some embodiments, the computer-executable instructions, when executed by the processor, can cause the processor to perform operations further including detecting a failure of one of the two or more virtual machines; determining that a failed virtual machine should be replaced; determining that enhanced redundancy is not to be provided for the failed virtual machine; and replacing the failed virtual machine with a single new virtual machine.

In some embodiments, the computer-executable instructions, when executed by the processor, can cause the processor to perform operations further including detecting a failure of one of the two or more virtual machines; determining that a failed virtual machine should be replaced; determining that enhanced redundancy is to be provided for the failed virtual machine; determining a number of new virtual machines to be instantiated to provide the enhanced redundancy; identifying a further pool of resources that are capable of providing the needs associated with the new virtual machines; identifying a further two or more resources of the further pool of resources, where the further two or more resources can include a most diverse group of the further pool of resources; and triggering instantiation of the new virtual machines on the further two or more resources.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
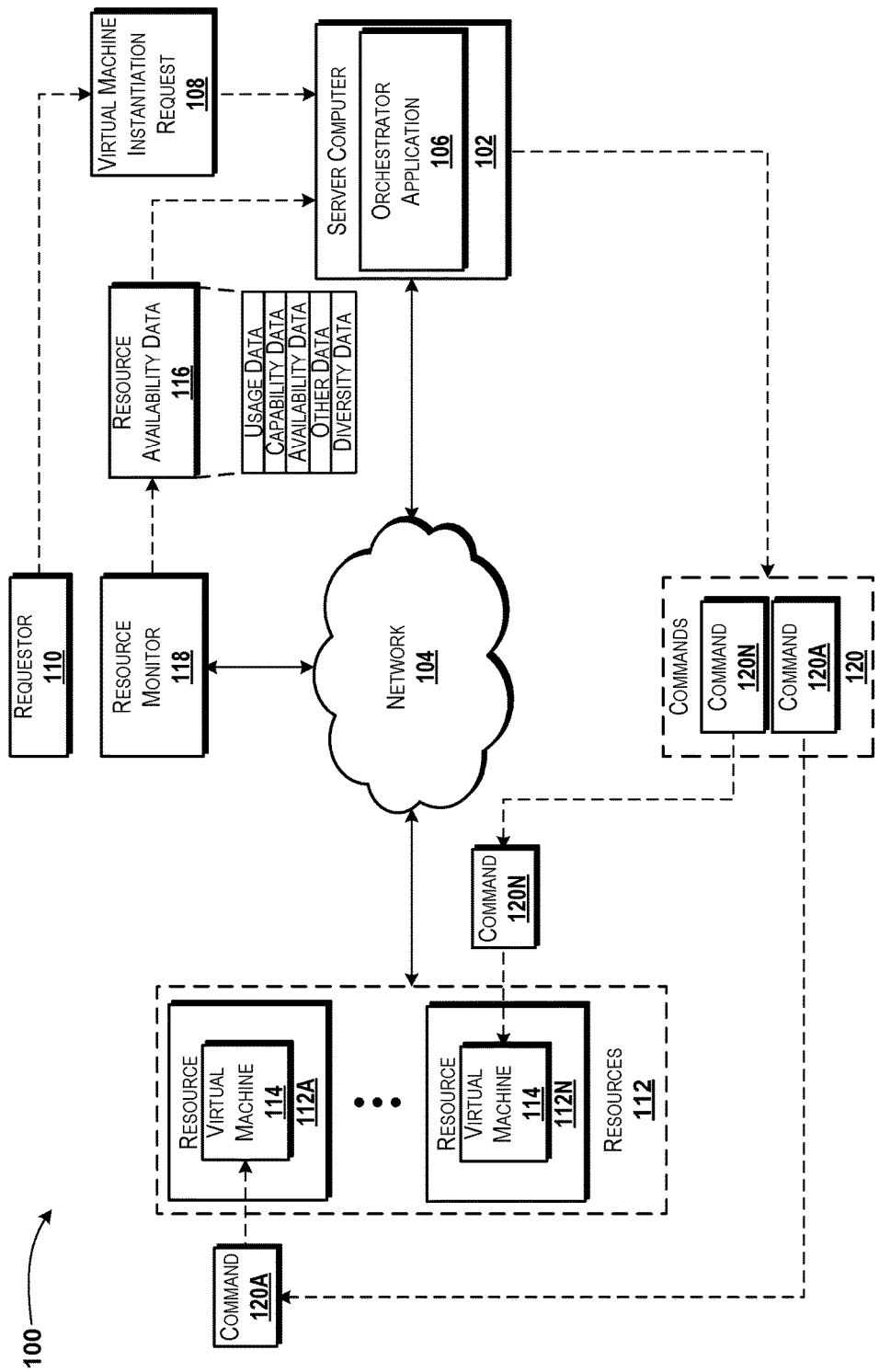
FIG. 1 is a system diagram illustrating an illustrative operating environment for various embodiments of the concepts and technologies described herein.

The following detailed description is directed to using diversity to provide redundancy of virtual machines. In some embodiments, a server computer can execute an orchestrator application. The server computer can receive a virtual machine instantiation request from a requestor and analyze the virtual machine request. Based upon the analysis, the server computer can determine a number of virtual machines that are needed or desired for a particular purpose or need. The number can correspond to the virtual machine requested and a number of redundant copies of the virtual machine needed or desired to satisfy a redundancy requirement. The server computer can analyze resource availability data obtained from a network monitor or other resource to identify a pool of resources that are capable of hosting the requested number of virtual machines. Once the pool of capable resources is identified by the orchestrator application, the orchestrator application can analyze diversity information included in the resource availability data to identify, among the pool of resources, the most diverse resources available. After identifying the most diverse resources that can host the virtual machines and/or redundant copies of the virtual machines, the orchestrator application can instantiate the instances of the virtual machines across the identified resources.

The concepts and technologies described herein also can be used to monitor the diverse set of virtual machines after instantiation and to take action if a virtual machine fails. In particular, in some embodiments of the concepts and technologies described herein, the orchestrator application can be configured to detect a failure of a virtual machine (or a redundant copy thereof). The orchestrator application can determine if the virtual machine should be replaced or repaired. If the orchestrator application determines that the virtual machine should be repaired (or determines that the virtual machine should not be replaced), the orchestrator application can repair the virtual machine. If the orchestrator application determines that the virtual machine should be replaced, the orchestrator application can determine if enhanced redundancy should be provided.

In the event that the orchestrator application determines that enhanced redundancy should not be provided, the orchestrator application can determine that only the failed virtual machine should be replaced. If the orchestrator application determines that enhanced redundancy should be provided, the orchestrator application can determine a number of extra virtual machines that should be instantiated to provide the enhanced redundancy of the remaining active virtual machines. The orchestrator application can identify a pool of resources that are capable of providing the needs of the virtual machines and again identify the most diverse resources available. In identifying the y most diverse resources, the orchestrator application can measure diversity relative to the remaining original set of virtual machines that are still active and the new resources identified for the new extra virtual machines. After identifying the new resources that are the most diverse from the existing set of resources that host the remaining virtual machines, the orchestrator application can instantiate instances of the virtual machines across the resources.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for using diversity to provide redundancy of virtual machines will be described, according to an illustrative embodiment. The operating environment 100 shown in FIG. 1 includes a server computer 102 operating in communication with and/or as part of a communications network ("network") 104.

According to various embodiments, the functionality of the server computer 102 may be provided by one or more server computers, desktop computers, mobile telephones, laptop computers, set-top boxes, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is described herein as a server computer. It should be understood that this embodiment is illustrative, and should not be construed as being limiting in any way.

The server computer 102 can execute an operating system (not shown in FIG. 1) and one or more application programs such as, for example, a an orchestrator application 106. The operating system can include a computer program that can control the operation of the server computer 102. The orchestrator application 106 can include an executable application configured to execute on top of the operating system to provide various functions illustrated and described herein for using diversity to provide redundancy of virtual machines.

In particular, the orchestrator application 106 can be configured to analyze a virtual machine instantiation request 108. The virtual machine instantiation request 108 can be received by the server computer 102 from a requestor 110. The requestor 110 can include almost any entity. For example, according to various embodiments the requestor 110 can correspond to an application, a service, an entity, a network operator, combinations thereof, or the like. Thus, a network operator, for example, can generate a command or request to create and/or instantiate virtual machines for a particular purpose or need. The command or request is illustrated in FIG. 1 as the virtual machine instantiation request 108. It should be understood that while the virtual machine instantiation request 108 is illustrated in FIG. 1 as being received by the server computer 102 from a requestor 110, in some embodiments an entity can interact with a user interface provided by the orchestrator application 106 (e.g., a web portal or the like) to create a command or request to create or instantiate one or more virtual machines. Thus, the illustrated embodiment should be understood as being illustrative of one contemplated embodiment and should not be construed as being limiting in any way.

The orchestrator application 106 can analyze the virtual machine instantiation request 108 and determine, based upon the virtual machine instantiation request 108, what needs are to be met by the one or more virtual machines requested by way of the virtual machine instantiation request 108. Thus, for example, the orchestrator application 106 can determine, based upon the virtual machine instantiation request 108, what application or service will use the virtual machines requested by way of the virtual machine instantiation request 108 and what the requirements or needs ("needs") of those virtual machines will be. The needs of the virtual machines can include, for example, a bandwidth of connections to and from the virtual machines, a processing capability of the virtual machines, a memory capability of the virtual machines, a redundancy requirement for the virtual machines, activation and/or deactivation times for the virtual machines, geographic location requirements or desires for the virtual machines, combinations thereof, or the like. These and other aspects of the virtual machines can be explicitly included in the virtual machine instantiation request 108 and/or determined by the orchestrator application 106 based upon information included in the virtual machine instantiation request 108.

For example, in some embodiments the virtual machine instantiation request 108 can include a data structure that includes data points such as parameters, flags, fields, headers, or the like. These data points can specify almost any aspect of the virtual machines requested by way of the virtual machine instantiation request 108. In some other embodiments, the virtual machine instantiation request 108 can request one or more virtual machines to execute a particular application or service, and the orchestrator application 106 can determine, based upon the requested application or service, the above and/or other aspects of the virtual machines. In some other embodiments, configurations, settings, preferences, policies, or the like can be used to provide some of this information. For example, a policy, setting, preference, configuration, or the like can specify a redundancy requirement for a particular application and/or type of application. The redundancy requirement can specify, for example, a number of redundant virtual machines that will be required for a particular application executed by a particular virtual machine, for example. It should be understood that this example is illustrative and therefore should not be construed as being limiting in any way.

According to various embodiments of the concepts and technologies described herein, the orchestrator application 106 can be configured to access, monitor, and/or control one or more hardware resources ("resources") 112A-N (hereinafter collectively and/or generically referred to as "resources 112"). In particular, the orchestrator application 106 can be configured to identify one or more available resources 112 that are capable of hosting one or more virtual machines requested by way of the virtual machine instantiation request 108. Thus, for example, the orchestrator application 106 can install, or cause other devices or entities to install, one or more virtual machines 114 on the resources 112. As shown in FIG. 1, the resources 112 can host redundant copies of the same virtual machine 114 and as such, the virtual machines 114 can be identical to one another, according to various embodiments of the concepts and technologies described herein.

According to various embodiments, the orchestrator application 106 can identify a pool of the resources 112. The pool of the resources 112 can include any of the resources 112 that are capable of hosting a virtual machine 114 that can provide the needs requested by the virtual machine instantiation request 108. To identify the pool of resources, the orchestrator application 106 can obtain resource availability data 116. The resource availability data 116 can include usage data, capability data, availability data, and/or other information that can be used to identify resources 112 that are available for use, the capacity of the resources 112, the processing and/or storage capabilities of the resources 112, bandwidth capabilities of connections to and from those resources 112, and/or other aspects of the resources 112. The resource availability data 116 also can include diversity information. This diversity information can specify various aspects of the resources 112, which can be used by the orchestrator application 106 to identify diversity among resources 112 as will be explained in more detail below.

The diversity information can be used, as will be explained in more detail below, to attempt to prevent certain types of systemic failures that may affect redundant versions of a particular virtual machine 114 if not addressed at instantiation and/or deployment time. The diversity information therefore can include, for example, location information, building information, floor information, rack information, row information, rack unit information, vendor information, server model information, server number information, power feeder information, server chipset information, top of the rack vendor information, virtualization environment information, age information, firmware information, operating system information, combinations thereof, or the like. The location information can provide a geographic location of the hardware that corresponds to the resource 112. The location information can be defined in broad terms (e.g., a country, state, ZIP code, or the like) and/or in narrow terms (a set of coordinates, an address, or the like). Because the location information can define a geographic location in almost any terms, it should be understood that these examples are illustrative and therefore should not be construed as being limiting in any way.

The building information can specify a particular building at a facility. Thus, if a facility has multiple buildings, the building information can specify a building. This information can be used to provide diversity among instantiated virtual machines 114 based on a building at which the resource 112 is located to attempt to prevent building-wide failures from affecting redundant virtual machines 114. The floor information can specify a particular floor at a facility or building. Thus, if a facility or building has multiple floors, the floor information can specify a floor. This information can be used to provide diversity among instantiated virtual machines 114 based on a floor at which the resource 112 is located to attempt to prevent floor-wide failures from affecting redundant virtual machines 114.

The rack information can specify a particular rack at a facility, building, floor, room, or the like. Thus, if a facility has multiple racks, which may be the case for a data center, the rack information can specify a rack for the resource 112. This information can be used to provide diversity among instantiated virtual machines 114 based on a rack at which the resource 112 is located to attempt to prevent rack-wide failures from affecting redundant virtual machines 114. The row information can specify a particular row in a rack. Thus, if a rack has multiple rows, the row information can specify a row for the resource 112. This information can be used to provide diversity among instantiated virtual machines 114 based on a row at which the resource 112 is located to attempt to prevent row-wide failures from affecting redundant virtual machines 114.

The rack unit information can specify a particular rack unit at a facility, building, floor, room, or the like. Thus, if a facility has multiple rack units, the rack unit information can specify a rack unit for the resource 112. This information can be used to provide diversity among instantiated virtual machines 114 based on a rack unit at which the resource 112 is located to attempt to prevent rack-unit-wide failures from affecting redundant virtual machines 114. The vendor information can specify a particular vendor for the resource 112. Thus, if the resources 112 are provided by multiple vendors, the vendor information can specify a vendor for a particular one of the resources 112. This information can be used to provide diversity among instantiated virtual machines 114 based on a vendor of a resource 112 at which the virtual machine 114 is instantiated, in an attempt to prevent vendor-specific failures from affecting redundant virtual machines 114.

The server model information can specify a particular server model for a resource 112. Thus, if multiple server models are used to support the resources 112, the server model information can specify a server model for a particular one of the resources 112. This information can be used to provide diversity among instantiated virtual machines 114 based on server models of resources 112 that host the virtual machines 114 in an attempt to prevent server-model-specific failures from affecting redundant virtual machines 114. The server number information can specify a server number (e.g., a serial number of a particular number of relevant digits or characters thereof) for a server that corresponds to the resource 112. Thus, if the resources 112 are hosted by multiple servers, the server number information can specify a server number for the resource 112. This information can be used to provide diversity among instantiated virtual machines 114 based on a server that hosts the resource 112 to attempt to prevent a server-specific failure from affecting redundant virtual machines 114.

The power feeder information can specify a particular power feeder that powers a device hosting the resource 112. Thus, if a facility has multiple power feeders, the power feeder information can specify a power feeder for the resource 112. This information can be used to provide diversity among instantiated virtual machines 114 based on a power feeder that powers the resource 112 in an attempt to prevent power failures from affecting redundant virtual machines 114. The server chipset information can specify a particular server chipset associated with the resource 112. This information can be used to provide diversity among instantiated virtual machines 114 based on a server chipset to attempt to prevent server-chipset-specific failures from affecting redundant virtual machines 114.

The top of the rack vendor information can specify a vendor for a top of the rack switch associated with a device that hosts or corresponds to the resource 112. Thus, if the resources 112 are hosted by servers that have different top of the rack switches, the top of the rack switch information can specify a top of the rack switch for the resource 112. This information can be used to provide diversity among instantiated virtual machines 114 based on a top of the rack switch of a server that hosts the resource 112 to attempt to prevent a top-of-the-rack-specific failure from affecting redundant virtual machines 114. The virtualization environment information can specify a virtualization environment for a server that corresponds to the resource 112. Thus, if the resources 112 are hosted by multiple servers, the virtualization environment information can specify a virtualization environment for the resource 112. This information can be used to provide diversity among instantiated virtual machines 114 based on a virtualization environment of a server that hosts the resource 112 to attempt to prevent a virtualization-environment-specific failure from affecting redundant virtual machines 114.

The age information can specify an age associated with a device that hosts or corresponds to the resource 112. Thus, if the resources 112 are hosted by servers that have different ages, the age information can specify an age of the resource 112. This information can be used to provide diversity among instantiated virtual machines 114 based on an age of a server that hosts the resource 112 to attempt to prevent an age-specific failure from affecting redundant virtual machines 114. The firmware information can specify an age associated with a device that hosts or corresponds to the resource 112. Thus, if the resources 112 are hosted by servers that have different firmware or firmware versions, the firmware information can specify a firmware of the resource 112. This information can be used to provide diversity among instantiated virtual machines 114 based on a firmware of a server that hosts the resource 112 to attempt to prevent a firmware-specific failure from affecting redundant virtual machines 114.

The operating system information can specify an operating system associated with a device that hosts or corresponds to the resource 112. Thus, if the resources 112 are hosted by servers that have different operating systems, the operating system information can specify an operating system of the resource 112. This information can be used to provide diversity among instantiated virtual machines 114 based on an operating system of a server that hosts the resource 112 to attempt to prevent an operating-system-specific failure from affecting redundant virtual machines 114. Because other types of information can be used to provide diversity among redundant resources as illustrated and described herein, it should be understood that these examples are illustrative and therefore should not be construed as being limiting in any way.

In some embodiments of the concepts and technologies described herein, the resource availability data 116 can be created by a resource monitor 118 or other device. The resource monitor 118 can be configured to monitor and/or analyze activity associated with resources 112 to identify available resources 112 that are capable of hosting a virtual machine 114 that can provide the requested needs and/or functions. In some other embodiments, the resources 112 can be configured to generate the resource availability data 116 and/or provide the resource availability data 116 to the server computer 102. In yet other embodiments, the server computer 102 can be configured to monitor the resources 112 and/or generate the resource availability data 116. Because other entities can generate the resource availability data 116, it should be understood that these examples are illustrative and therefore should not be construed as being limiting in any way.

According to various embodiments, the resource availability data 116 can include load and/or utilization information, capacity information, capability information, combinations thereof, or the like. The information can be analyzed by the orchestrator application 106 to identify the pool of the resources 112 that can provide the functionality requested by way of the virtual machine instantiation request 108.

When generating the resource availability data 116, the resource monitor 118 and/or other entity can determine a load, bandwidth, processor, storage, utilization, and/or other capabilities or loads at various time increments. Thus, for example, these and/or other data points can be determined and/or collected at intervals of one or more milliseconds, one or more seconds, one or more minutes, one or more hours, one or more days, or the like. It can be appreciated that various time intervals may be chosen and/or used based upon fluctuation of these data points and/or a frequency with which the resource availability data 116 is expected to be used by the orchestrator application 106.

In some embodiments, the server computer 102 (or the orchestrator application 106 executed thereby) can analyze the virtual machine instantiation request 108 and determine a number n of virtual machines 114 that are needed or desired for a particular purpose or need. The server computer 102 (and/or the orchestrator application 106 executed thereby) can analyze the resource availability data 116 and identify n (at least two) of the resources 112 that are capable of hosting the n virtual machine 114 requested by way of the virtual machine instantiation request 108. These n resources 112 can be subjected to additional analysis to determine to which resources 112 the virtual machines 114 requested by way of the virtual machine instantiation request 108 should be deployed, as will be explained in more detail below.

Once the pool of capable resources 112 is identified by the orchestrator application 106, the orchestrator application 106 can identify a particular number n of that pool of resources 112. The number n can be specified, for example, by the virtual machine instantiation request 108, a setting, an option, a configuration, and/or other considerations. Regardless of how the number n is determined, the number n can correspond to a number of redundant copies of the virtual machine 114 that are to be created to support the need specified by the virtual machine instantiation request 108.

To identify the n resources 112, however, the orchestrator application 106 performs additional analysis. In particular, the diversity information illustrated and described herein can be used to identify, among the pool of resources 112, the n most diverse resources 112 available. To provide this functionality, some embodiments of the concepts and technologies described herein can generate a diversity score for each of the pool of resources 112 and select the n most diverse resources 112 based upon the diversity scores. In some other embodiments, the orchestrator application 106 can compare each resource 112 to another by analyzing diversity information of the respective resources 112. The n most diverse resources 112 can be selected based upon this analysis. Because the n most diverse resources 112 can be identified in additional and/or alternative ways, it should be understood that this example is illustrative and therefore should not be construed as being limiting in any way.

After identifying the n most diverse resources 112 that can host the virtual machines 114 and/or redundant copies of the virtual machines 114, the orchestrator application 106 can instantiate the n instances of the virtual machines 114 across the n resources 112. As such, the orchestrator application 106 can effect instantiation of n virtual machines 114 across n resources 112 in a manner that can minimize the risk of multiple copies of the virtual machine 114 going offline simultaneously by maximizing redundancy of the virtual machines 114 based upon the resource diversity.

The concepts and technologies described herein also can be used to monitor the virtual machines 114 after instantiation and to take action if a virtual machine 114 fails. In particular, in some embodiments of the concepts and technologies described herein, the orchestrator application 106 can be configured to detect a failure of a virtual machine 114 (or a redundant copy of a virtual machine 114). The orchestrator application 106 can determine if the virtual machine should be replaced or repaired. The orchestrator application 106 can make this determination based upon a known or determined redundancy requirement for the virtual machine 114 (e.g., knowledge of the value n as illustrated and described above), a determination of what will be involved with repair of the virtual machines 114, a cost (in terms of time, resource usage, resource consumption, or the like) to repair the virtual machine 114 versus replacing the virtual machine 114, combinations thereof, or the like. Because the orchestrator application 106 can determine whether the virtual machine 114 should be repaired or replaced in additional and/or alternative ways, it should be understood that these examples are illustrative and therefore should not be construed as being limiting in any way.

If the orchestrator application 106 determines that the virtual machine 114 should not be replaced, the orchestrator application 106 can repair the virtual machine 114. If the orchestrator application 106 determines that the virtual machine 114 should be replaced (e.g., if the cost to repair the virtual machine 114 exceeds the cost to replace the virtual machine 114), the orchestrator application 106 can determine if enhanced diversity-based redundancy (hereinafter referred to as "enhanced redundancy") should be provided. The orchestrator application 106 can determine whether or not the previous redundancy requirement for the virtual machines 114, namely the number n as illustrated and described above, is insufficient or sufficient.

In the event that the orchestrator application 106 determines that enhanced redundancy should not be provided, the orchestrator application 106 can determine that only the failed virtual machine 114 should be replaced. If the orchestrator application 106 determines that enhanced redundancy should be provided, the orchestrator application 106 can determine a number y of extra virtual machines 114 that should be instantiated to provide the enhanced redundancy of the n−1 virtual machines 114 currently active (the n virtual machines 114 minus the failed virtual machine 114).

The orchestrator application 106 can identify a pool of resources 112 that are capable of providing the needs of they virtual machines 114 and again identify the most diverse resources 112 available. In identifying the y most diverse resources, the orchestrator application 106 can measure diversity relative to the n−1 virtual machines 114 still active. Thus, the n−1 plus y resources 112 may collectively represent a number m of the most diverse resources 112 available. It should be understood that this example is illustrative and therefore should not be construed as being limiting in any way.

After identifying the y resources 112 that are the most diverse from the n−1 resources 112, the orchestrator application 106 can instantiate y instances of the virtual machines 114 across they resources 112. It should be noted that to instantiate the virtual machines 114 on the resources 112, the orchestrator application 106 can issue one or more commands 120A-N (hereinafter collectively and/or generically referred to as "commands 120") to the resources 112. The commands 120 can instruct the resources 112 to instantiate or activate the virtual machines 114, install the virtual machines 114, access a virtual machine 114 and create a copy of the virtual machine 114, or the like. Thus, the orchestrator application 106 can cause the resources 112 to install the virtual machines 114 via one or more of the commands 120, if desired, and need not load images of the virtual machines 114 itself.

In light of the above, it can be appreciated that the orchestrator application 106 can effect instantiation of y virtual machines 114 across y resources 112 in a manner that can minimize the risk of multiple copies of the virtual machine 114 (from the n−1+y resources 112) going offline simultaneously by maximizing redundancy of the virtual machines 114 based upon the resource diversity. These and other aspects of the concepts and technologies described herein will be illustrated and described in more detail below.

FIG. 1 illustrates one server computer 102, one network 104, one requestor 110, two or more resources 112, two or more virtual machines 114, and one resource monitor 118. It should be understood, however, that various implementations of the operating environment 100 can include zero, one, or more than one server computer 102; zero, one, or more than one network 104; zero, one, or more than one requestor 110; zero, one, two, or more than two resources 112; zero, one, two, or more than two virtual machines 114; and/or zero, one, or more than one resource monitors 118. As such, the illustrated embodiment should be understood as being illustrative, and should not be construed as being limiting in any way.

Figure 2:
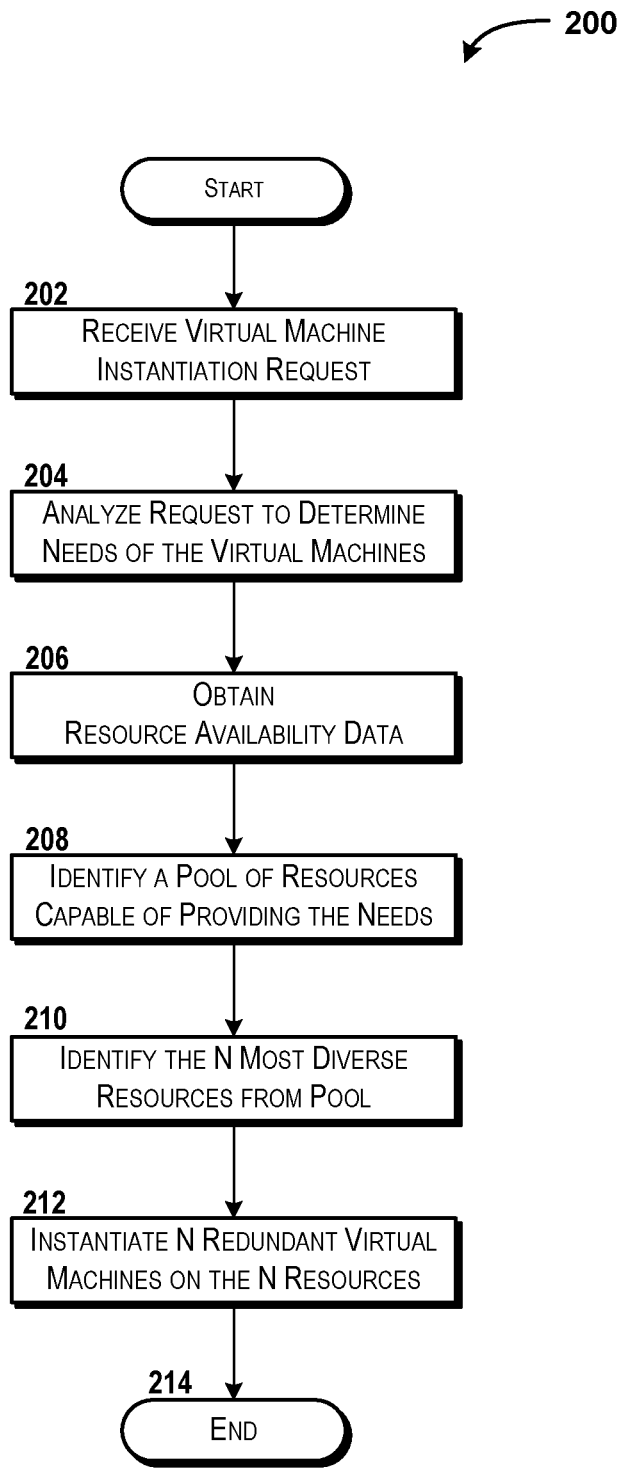
FIG. 2 is a flow diagram showing aspects of a method for using diversity to provide redundancy of virtual machines, according to an illustrative embodiment of the concepts and technologies described herein.

Turning now to FIG. 2, aspects of a method 200 for using diversity to provide redundancy of virtual machines will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the orchestrator application 106. It should be understood that additional and/or alternative devices and/or network nodes can provide the functionality described herein via execution of one or more modules, applications, and/or other software including, but not limited to, the orchestrator application 106. Thus, the illustrated embodiments are illustrative, and should not be viewed as being limiting in any way.

The method 200 begins at operation 202. At operation 202, the server computer 102 receives a virtual machine instantiation request. According to various embodiments of the concepts and technologies described herein, the request received in operation 202 can be similar to or even identical to the virtual machine instantiation request 108 illustrated and described above with reference to FIG. 1. As such, it can be appreciated that the request received in operation 202 can be generated by a requestor such as the requestor 110.

The request received in operation 202 can be created by a requestor 110 in any number of ways and/or for any number of purposes. The request can correspond to a service call (e.g., the orchestrator application 106 can operate as a callable service that can identify resources 112 on demand and/or on request of an application, function, or service); an explicit request (e.g., a user, application, or other entity can request identification of the resources 112); or other types of requests. Thus, it should be understood that the request for identification of the resources 112 and/or instantiation of the virtual machines 114 can be explicit or implicit, according to various embodiments. Regardless of how the request is made, the server computer 102 can determine, in operation 202, that identification of the resources 112 and/or instantiation of the virtual machines 114 is requested or desired.

From operation 202, the method 200 proceeds to operation 204. At operation 204, the server computer 102 can analyze the request received in operation 202 to determine needs of the virtual machines 114 requested by way of the request. To determine the needs of the virtual machines 114, the server computer 102 can determine a particular service, application, function, functionality, or the like, of the virtual machines 114 requested by the request. Thus, for example, the server computer 102 can determine a geographic location requirement, a computing power requirement, a power usage requirement, a memory storage requirement, an ownership requirement, a co-location requirement, a redundancy requirement, and/or other requirements associated with the requested virtual machine 114. It should be understood that a "requirement" or "need" as used herein to refer to the needs or requirements of the virtual machines 114 can also include requested or desired features or the like.

According to various embodiments of the concepts and technologies described herein, operation 204 can at least include determining a number n of virtual machines 114 that are to be instantiated, where the number n includes the virtual machine 114 requested and the number of redundant copies of the virtual machine 114 to meet a specified or determined redundancy requirement. Thus, the "needs" of the virtual machines 114 that are determined in operation 204 can include a redundancy requirement, need, or preference. It should be understood that this example is illustrative and therefore should not be construed as being limiting in any way.

From operation 204, the method 200 proceeds to operation 206. At operation 206, the server computer 102 can obtain resource availability data such as the resource availability data 116. The resource availability data obtained in operation 206 can include, for example, two or more resources 112 that have availability, what kinds of functions the resources 112 can perform, what kinds and/or formats of communications those resources 112 can support, a capacity of the resources 112, geographical location(s) of the resources 112, ownership information for the resources 112, power feed information for the resources 112, and/or other information (e.g., building information, floor information, rack information, row information, top of the rack switch information, vendor information, version information, OS information, combinations thereof, or the like). It can be appreciated that the information obtained in operation 206 can include, but is not necessarily limited to, the various types of information illustrated and described above with reference to the resource availability data 116 in FIG. 1. These and other types of information can be used to determine diversity among the two or more resources 112, as explained above with reference to FIG. 1.

From operation 206, the method 200 proceeds to operation 208. At operation 208, the server computer 102 can identify a pool of resources 112 that are capable of providing the needs determined in operation 204. The term "pool," as used herein, can be used to refer to any group of two or more resources 112. Thus, a pool can include a list, table, or other data structure that identifies two or more resources 112, though this is not necessarily the case. The pool of resources 112 identified in operation 208 can include a representation or identification of two or more resources 112 that can provide the required virtual machine 114 and at least one redundant copy of the virtual machine 114. Thus, the pool identified in operation 208 identifies at least two resources 112.

From operation 208, the method 200 proceeds to operation 210. At operation 210, the server computer 102 can identify, from among the pool of resources 112 identified in operation 208, the n most diverse resources 112. The server computer 102 can identify the n most diverse resources 112 in a number of manners. In one contemplated embodiment, the server computer 102 can determine a number of factors that are to be considered when determining diversity. In one embodiment of the concepts and technologies described herein, the factors can include the various data illustrated and described above with respect to the resource availability data 116 and therefore can include geographical information, power feed information, vendor information, and/or the other information and/or types of information illustrated and described herein. These data can be determined for each of the resources 112 in the pool identified in operation 208.

Thus, for example, a pool of resources can include a first resource 112 ("ResourceA") and a second resource 112 ("ResourceB"). Several data points $\{X, Y, Z\}$ can be determined for ResourceA and ResourceB. For example, X can correspond to a location, Y can correspond to a vendor, and Z can correspond to a power feed. It should be understood that this example is illustrative, and that the data points in the data set can correspond to any information that may be used for diversity including, but not limited to, the types of information illustrated and described above with reference to the resource availability data 116 illustrated and described above with reference to FIG. 1.

For ResourceA, a data set $\{X_A, Y_A, Z_A\}$ can be determined and for ResourceB, a data set $\{X_B, Y_B, Z_B\}$ can be determined. The server computer 102 can compare the two data sets to identify diversity among the data sets. In some embodiments, the diversity can also be measured. Thus, for example, location diversity can be specified as a number of feet, miles, etc. After determining, for every resource 112 in the pool, values for respective data sets, diversity can be determined among the values and the most diverse resources 112 can be identified in operation 210. It should be understood that this example is illustrative and therefore should not be construed as being limiting in any way.

In another contemplated embodiment, the concepts and technologies described herein can provide a host naming convention for the resources 112. The host naming convention can be used, according to various embodiments of the concepts and technologies described herein, to identify the most diverse resources 112 in operation 210 (and/or in other operations). According to one embodiment, the naming convention includes using a dotted string format to represent a host or resource 112. The dotted string format can include a geographic location, a rack, a row, a rack unit, a server vendor, a server type, a power supply source or power feed, a serial number, a chipset vendor, a networking vendor, a virtualization environment, other information, and/or any combination thereof. Thus, in one contemplated embodiment, the dotted string format can include, for example, these or other data points separated by periods, underscores, or other characters. It should be understood that the information included in the host naming convention can include the information illustrated and described above with reference to the resource availability data 116 illustrated and described in FIG. 1, though this is not necessarily the case. Thus, identifying diverse resources 112 can include comparing strings for multiple resources 112 to identify the most diverse resources 112. In another contemplated embodiment, each portion of information (offset by periods, underscores, or the like) can be compared to one another, hashed and compared to one another, or otherwise compared to identify differences and/or degrees of differences. This information can be used to identify the most diverse resources 112. It should be understood that this example is illustrative and therefore should not be construed as being limiting in any way.

Because diversity can be determined in various manners, it should be understood that the above examples are illustrative and therefore should not be construed as being limiting in any way. Furthermore, because the pool can include almost any number of resources 112 (e.g., the number n can be any value two or greater), it should be understood that the above example of two resources 112 is merely illustrative and should not be construed as being limiting in any way. It also can be appreciated from the above description, that the most diverse resources 112 may be located at a single data center (in data center embodiments) or among multiple data centers. It should be understood that this example is illustrative and therefore should not be construed as being limiting in any way.

From operation 210, the method 200 proceeds to operation 212. At operation 212, the server computer 102 can instantiate the n instances of the virtual machine 114 on the n resources 112. According to various embodiments, the server computer 102 can issue two or more commands 120, e.g., one command 120 for each of the identified resources 112. The commands 120 can instruct the resources 112 to instantiate or activate the virtual machines 114, to install the virtual machines 114, to access a virtual machine 114 and create a copy of the virtual machine 114, to request instantiation of the virtual machines 114, or the like. Thus, the server computer 102 can cause the resources 112 to install (or request installation of) the virtual machines 114 and therefore may or may not load images of the virtual machines 114 to the resources 112. It should be understood, however, that the server computer 102 can be configured to load the images of the virtual machines 114 to the resources 112, in some embodiments, and as such the above example embodiment should not be construed as being limiting in any way.

From operation 212, the method 200 proceeds to operation 214. The method 200 ends at operation 214.

Figure 3:
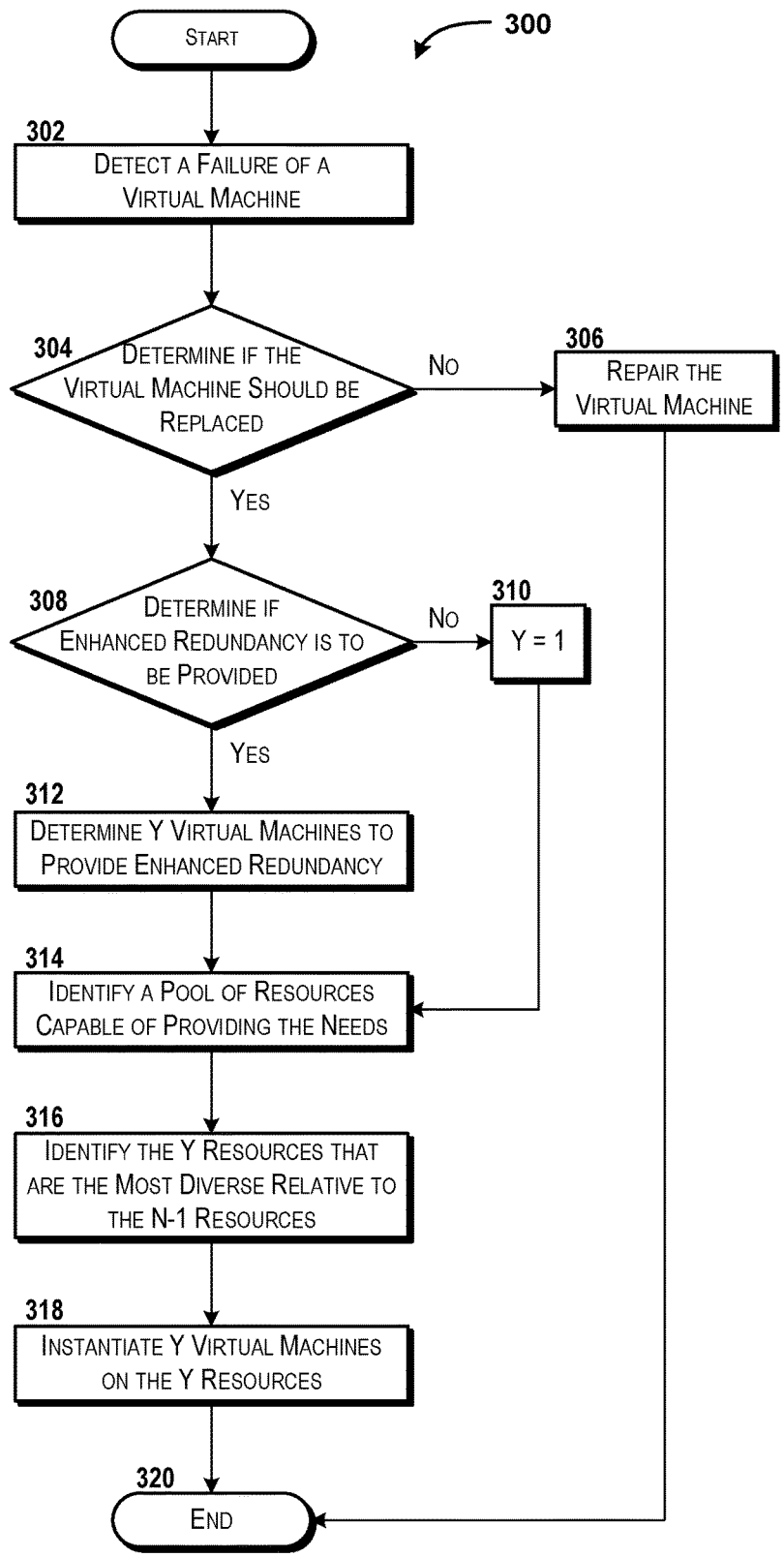
FIG. 3 is a flow diagram showing aspects of a method for using diversity to provide redundancy of virtual machines, according to another illustrative embodiment of the concepts and technologies described herein.

Turning now to FIG. 3, aspects of a method 300 for using diversity to provide redundancy of virtual machines will be described in detail, according to another illustrative embodiment. The method 300 begins at operation 302. At operation 302, the server computer 102 can detect a failure of a virtual machine 114. It should be understood that the server computer 102 can monitor performance of the virtual machines 114 and that, as such, the server computer 102 can detect failure of a virtual machine 114 and/or can receive, from a network monitor, the resource monitor 118, and/or other entities, an indication that the virtual machine 114 has failed. Because the server computer 102 can determine or be informed of failure of a virtual machine 114 in a variety of manners, it should be understood that these examples are illustrative and therefore should not be construed as being limiting in any way.

From operation 302, the method 300 proceeds to operation 304. At operation 304, the server computer 102 can determine if the virtual machine 114 that was detected as failing in operation 302 should be replaced. The server computer 102 can make this determination in a number of manners. In some embodiments, the server computer 102 can be configured to determine a cost of replacing the virtual machine 114 and a cost of repairing the virtual machine 114. The "cost" can be measured in terms of currency, time, manpower, computing power, communication resource consumption, downtime, bandwidth consumption, combinations thereof, or the like. The costs for each of repairing the virtual machine 114 and replacing the virtual machine 114 can be calculated and compared to one another. The option (replacing or repairing) having the smaller cost can be selected, in some embodiments. In some other embodiments, settings, preferences, and/or other considerations may dictate whether a particular virtual machine 114 is replaced or repaired. Regardless of how this determination is made, the server computer 102 can determine, in operation 304, if the virtual machine 114 that failed should be replaced or repaired.

If the server computer 102 determines, in operation 304, that the virtual machine 114 should not be replaced, the method 300 can proceed to operation 306. At operation 306, the server computer 102 can repair the virtual machine 114. It should be understood that the server computer 102 can repair the virtual machine 114, in some embodiments, while in some other embodiments the server computer 102 can request repair of the virtual machine 114 by another element or entity.

If the server computer 102 determines, in operation 304, that the virtual machine 114 should be replaced, the method 300 can proceed to operation 308. At operation 308, the server computer 102 can determine if enhanced diversity-based redundancy (referred to hereinafter as "enhanced diversity") should be provided when replacing the virtual machine 114 that was detected as failing in operation 302. The determination as to whether or not enhanced diversity should be provided can be made in a number of ways.

In some embodiments, the server computer 102 can determine a time for which the virtual machine 114 has been active, a number of failures of the virtual machines 114 over a time period, an expected or determined reliability of the virtual machines 114, combinations thereof, or the like. Based upon these and/or other types of information, the server computer 102 can determine if the virtual machine 114 that failed should be replaced 1 to 1 or if extra redundant virtual machines 114 should be provided.

In some other embodiments, settings, preferences, options, or the like can specify particular circumstances, locations, applications, or the like that may dictate whether or not the virtual machine 114 that failed should be replaced one to one or if extra copies of the virtual machine 114 should be provided. In some embodiments, if the failure of the virtual machine 114 as detected in operation 302 is a second or subsequent failure of a virtual machine 114 or a redundant copy thereof, the server computer 102 can be configured to provide enhanced redundancy to attempt to prevent a catastrophic failure of the virtual machines 114 and/or copies thereof.

Thus, for example, if the failure detected in operation 302 corresponds to a third failure of a virtual machine 114 (or a redundant copy thereof) during a specified timeframe (e.g., one day, one week, one hour, or the like), the server computer 102 can determine that enhanced redundancy should be provided to the extent that the failures have occurred (in this case three). Thus, the server computer 102 could determine, in this example, that an enhanced redundancy of three virtual machines 114 should be provided based upon the previous failures. Because the number of virtual machines 114 to be provided in an enhanced redundancy scheme can be determined in various manners, it should be understood that the above example is illustrative and therefore should not be construed as being limiting in any way.

If the server computer 102 determines, in operation 308, that enhanced redundancy should not be provided when replacing the virtual machine 114, the method 300 can proceed to operation 310. At operation 310, the server computer 102 can set a new number y as being equal to one. As will be explained in more detail below, the number y can correspond to a number of virtual machines 114 to be instantiated by the server computer 102 and as such, setting y equal to one can indicate that the failed virtual machine 114 is merely to be replaced. It should be understood that this example is illustrative and therefore should not be construed as being limiting in any way.

If the server computer 102 determines, in operation 308, that enhanced diversity-based redundancy should be provided when replacing the virtual machine 114, the method 300 can proceed to operation 312. At operation 312, the server computer 102 can determine a number y of virtual machines 114 that are be instantiated to provide the enhanced redundancy as explained above. In some embodiments, as explained above, the number y can be specified by options, settings, configurations, or the like. In some other embodiments, formulae and/or algorithms for determining the number y based upon other considerations (e.g., the number of failures in a specified time, the probability of future failures, or the like) can be used to determine y. Because y can be determined in a number of ways, it should be understood that the above examples are illustrative and should not be construed as being limiting in any way.

From operation 312, the method 300 proceeds to operation 314. The method 300 also can proceed to operation 314 from operation 310. At operation 314, the server computer 102 can identify a pool of resources 112 that are capable of providing the needs of the virtual machines 114 to provide the enhanced redundancy. Thus, the server computer 102 can identify resources 112 that can provide a redundant copy of the virtual machine 114 that failed. Again, the pool can include a representation or identification of one or more resources 112 that can provide the required virtual machine 114 or a redundant copy of the virtual machine 114. Thus, the pool identified in operation 314 can identify one or more resource 112.

From operation 314, the method 300 proceeds to operation 316. At operation 316, the server computer 102 can identify, from among the pool of resources 112 identified in operation 208, they resources 112 that are the most diverse relative to the n−1 resources 112 that continue to host the remaining n−1 virtual machines 114. As explained above with reference to operation 210 in FIG. 2, the server computer 102 can identify the most diverse resources in a number of manners. In one contemplated embodiment of the concepts and technologies described herein, the server computer 102 can be configured to create a pool of resources 112 that includes the n−1 resources 112 and all resources 112 that can provide the functionality of the virtual machine 114 and then select, from this pool, the most diverse resources 112.

Thus, it can be appreciated that in some embodiments, the server computer 102 can move a virtual machine 114 from one resource 112 to another resource 112. In some other embodiments, virtual machines 114 may not be moved and therefore, the server computer 102 can identify from among a pool of resources 112 that do not yet host the virtual machines 114, which of the resources 112 are the most diverse. Regardless of the approach used to select the most diverse resources 112, the resources 112 selected by the server computer 102 can correspond to the resources 112 that are the most diverse with respect to the n−1 resources 112 (whether a part of the pool or not). It should be understood that this example is illustrative and therefore should not be construed as being limiting in any way.

From operation 316, the method 300 proceeds to operation 318. At operation 318, the server computer 102 can instantiate they instances of the virtual machine 114 on the y resources 112. According to various embodiments, the server computer 102 can issue one or more command 120, e.g., one command 120 for each of the identified y resources 112. The command 120 can instruct the resources 112 to instantiate or activate the virtual machines 114, to install the virtual machines 114, to access a virtual machine 114 and create a copy of the virtual machine 114, to request instantiation of the virtual machines 114, or the like. Thus, the server computer 102 can cause the resources 112 to install (or request installation of) the virtual machines 114 and therefore may or may not load images of the virtual machines 114 to the resources 112. It should be understood, however, that the server computer 102 can be configured to load the images of the virtual machines 114 to the resources 112, in some embodiments, and as such the above example embodiment should not be construed as being limiting in any way.

From operation 318, the method 300 proceeds to operation 320. The method 300 also can proceed to operation 320 from operation 306, if the server computer 102 repairs the virtual machine 114. The method 300 ends at operation 320.

While the methods 200, 300 illustrated and described in FIGS. 2-3 have been described with respect to instantiating virtual machines 114, it should be understood that the concepts and technologies described herein can be used to instantiate functions such as virtual network functions ("VNFs"), virtual application or service functions ("VSFs"), and the like. As such, the resources 112 need not be identified solely for virtual machines 114, as functions and/or modules of virtual machines 114, as well as service components such as VSFs, or the like, can be deployed in accordance with embodiments of the concepts and technologies described herein. As such, the example embodiments shown in FIGS. 2-3 are illustrative and should not be construed as being limiting in any way.

Figure 4:
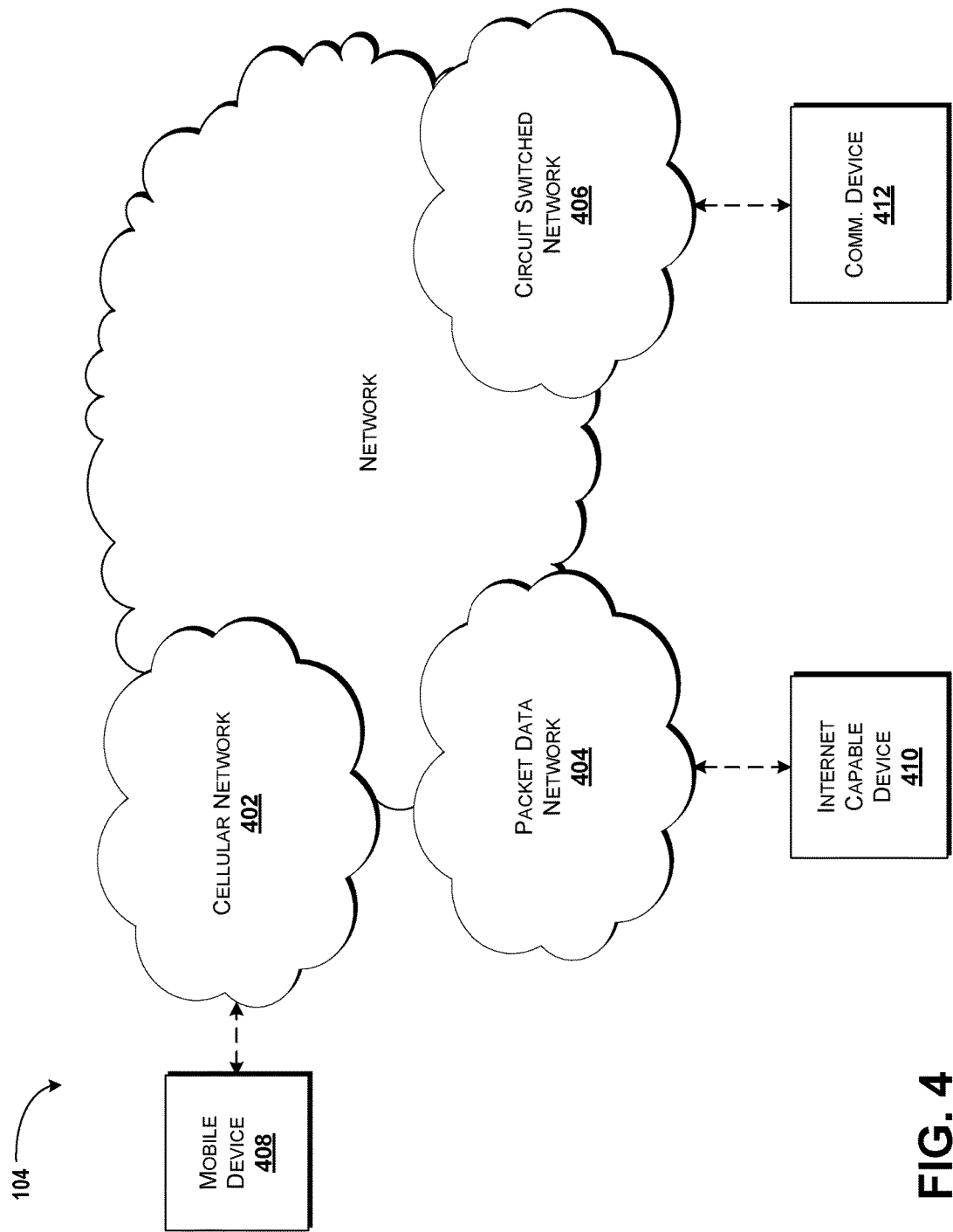
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
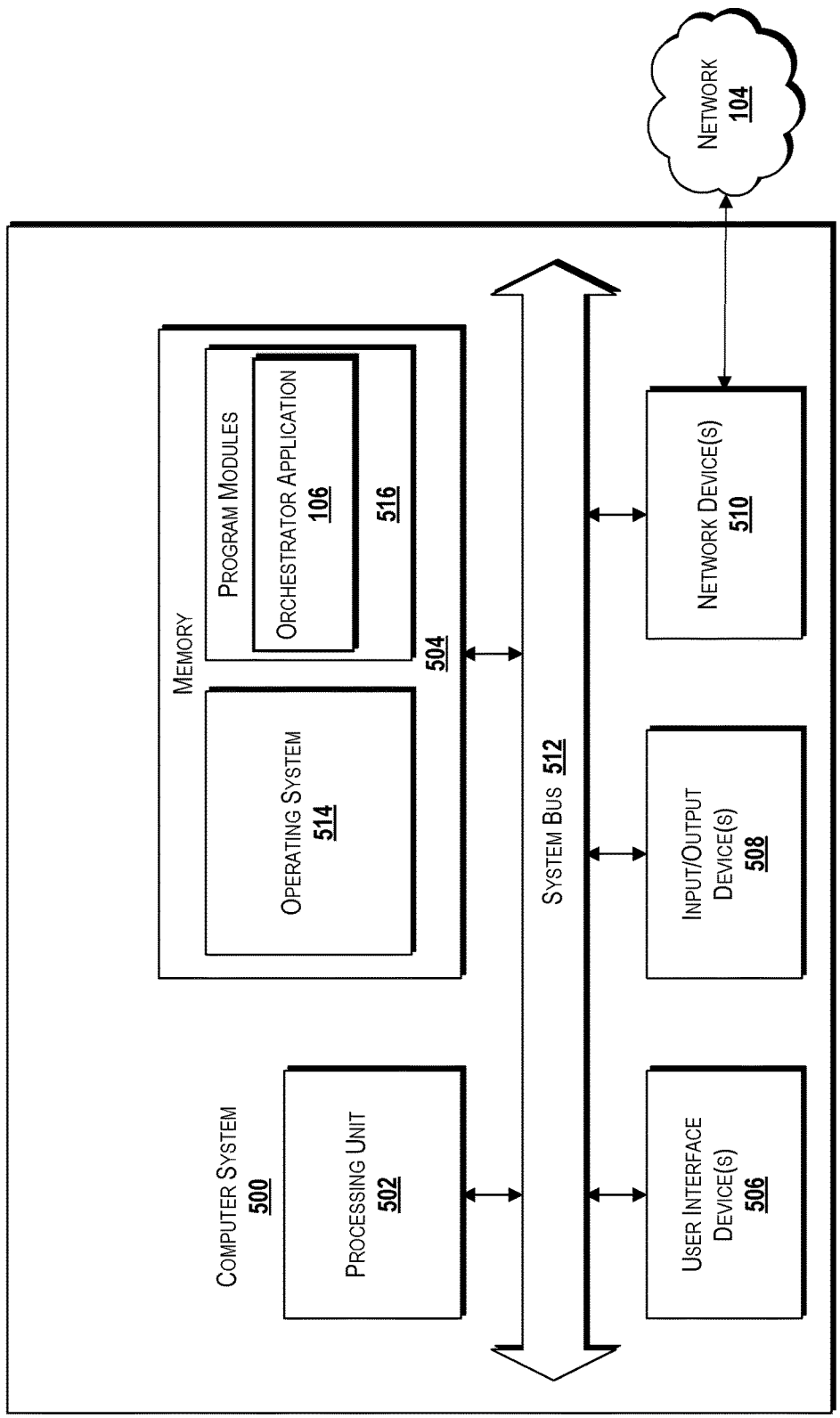
FIG. 5 is a block diagram illustrating an example computer system configured to use diversity to provide redundancy of virtual machines, according to some illustrative embodiments of the concepts and technologies described herein.

FIG. 5 is a block diagram illustrating a computer system 500 configured to provide the functionality described herein for using diversity to provide redundancy of virtual machines, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the orchestrator application 106. This and/or other programs can be embodied in computer-readable media containing instructions that, when executed by the processing unit 502, perform one or more of the methods 200, 300 described in detail above with respect to FIGS. 2-3. According to embodiments, the program modules 516 may be embodied in hardware, software, firmware, or any combination thereof. Although not shown in FIG. 5, it should be understood that the memory 504 also can be configured to store the virtual machine instantiation request 108, the resource availability data 116, the commands 120, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for using diversity to provide redundancy of virtual machines have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      analyzing a virtual machine instantiation request to determine a redundancy requirement associated with a virtual machine requested by the virtual machine instantiation request,
      obtaining resource availability data that comprises diversity data, wherein the resource availability data indicates availability of resources,
      identifying a pool of resources that are capable of hosting the virtual machine,
      identifying a plurality of resources of the pool of resources, wherein the plurality of resources comprises a most diverse group of resources of the pool of resources, and wherein the plurality of resources is identified based upon the diversity data, and
      triggering instantiation of a plurality of virtual machines on the plurality of resources, wherein the plurality of virtual machines comprises the virtual machine and a copy of the virtual machine.

2. The system of claim 1, wherein identifying the most diverse group of resources comprises analyzing host names for resources of the pool of resources to determine diversity, wherein the host names are formatted in a dotted string format that comprises the diversity data.

3. The system of claim 1, wherein the computer-executable instructions, when executed by the processor, cause the processor to perform operations further comprising:
   detecting a failure of one of the plurality of virtual machines; and
   in response to determining that a failed virtual machine should not be replaced, repairing the failed virtual machine.

4. The system of claim 1, wherein the computer-executable instructions, when executed by the processor, cause the processor to perform operations further comprising:
   detecting a failure of one of the plurality of virtual machines;
   determining that a failed virtual machine should be replaced;
   determining that enhanced redundancy is not to be provided for the failed virtual machine; and
   replacing the failed virtual machine with a single new virtual machine.

5. The system of claim 1, wherein the computer-executable instructions, when executed by the processor, cause the processor to perform operations further comprising:
   detecting a failure of one of the plurality of virtual machines;
   determining that a failed virtual machine should be replaced;
   determining that enhanced redundancy is to be provided for the failed virtual machine;
   determining a number of new virtual machines to be instantiated to provide the enhanced redundancy;
   identifying a further pool of resources that are capable of providing needs associated with the new virtual machines;
   identifying a most diverse group of the further pool of resources; and
   triggering instantiation of the new virtual machines on the most diverse group of the further pool of resources.

6. A method comprising:
   analyzing, by a processor that executes an orchestrator application, a virtual machine instantiation request to determine a redundancy requirement associated with a virtual machine requested by the virtual machine instantiation request;

obtaining, by the processor, resource availability data that comprises diversity data, wherein the resource availability data indicates availability of resources;

identifying, by the processor, a pool of resources that are capable of hosting the virtual machine;

identifying, by the processor, a plurality of resources of the pool of resources, wherein the plurality of resources comprises a most diverse group of resources of the pool of resources, and wherein the plurality of resources is identified based upon the diversity data; and triggering, by the processor, instantiation of a plurality of virtual machines on the plurality of resources, wherein the plurality of virtual machines comprises the virtual machine and a copy of the virtual machine.

7. The method of claim 6, wherein the diversity data comprises data selected from a group of data consisting of vendor information, geographic location information, building information, rack information, row information, virtualization environment information, and power feed information.

8. The method of claim 6, wherein identifying the plurality of resources comprises identifying the most diverse group of resources, wherein the most diverse group of resources is identified by comparing host names of the resources of the pool of resources, wherein the host names comprise the diversity data formatted as data points separated by a character.

9. The method of claim 6, wherein the resource availability data is provided by the resources.

10. The method of claim 6, wherein triggering the instantiation comprises issuing a plurality of commands to the plurality of resources, wherein the plurality of commands cause the plurality of resources to instantiate the plurality of virtual machines.

11. The method of claim 6, further comprising:
detecting a failure of one of the plurality of virtual machines;
determining that a failed virtual machine should be replaced;
determining that enhanced redundancy is to be provided for the failed virtual machine;
determining a number of new virtual machines to be instantiated to provide the enhanced redundancy;
identifying a further pool of resources that are capable of providing needs associated with the new virtual machines;
identifying a further plurality of resources of the further pool of resources, wherein the further plurality of resources comprises a most diverse group of the further pool of resources; and
triggering instantiation of the new virtual machines on the further plurality of resources.

12. The method of claim 6, further comprising:
detecting a failure of one of the plurality of virtual machines; and
in response to determining that a failed virtual machine should not be replaced, repairing the failed virtual machine.

13. The method of claim 6, further comprising:
detecting a failure of one of the plurality of virtual machines;
determining that a failed virtual machine should be replaced;

determining that enhanced redundancy is not to be provided for the failed virtual machine; and
replacing the failed virtual machine with a single new virtual machine.

14. The method of claim 6, wherein the plurality of resources are located at a single data center.

15. The method of claim 6, wherein the plurality of resources are located at a plurality of data centers.

16. A computer storage medium having computer-executable instructions stored thereon that, when executed by a processor, cause the processor to perform operations comprising:
analyzing a virtual machine instantiation request to determine a redundancy requirement associated with a virtual machine requested by the virtual machine instantiation request;
obtaining resource availability data that comprises diversity data, wherein the resource availability data indicates availability of resources;
identifying a pool of resources that are capable of hosting the virtual machine;
identifying a plurality of resources of the pool of resources, wherein the plurality of resources comprises a most diverse group of resources of the pool of resources, and wherein the plurality of resources is identified based upon the diversity data; and
triggering instantiation of a plurality of virtual machines on the plurality of resources, wherein the plurality of virtual machines comprises the virtual machine and a copy of the virtual machine.

17. The computer storage medium of claim 16, wherein identifying the most diverse group of resources comprises analyzing host names for resources of the pool of resources to determine diversity, wherein the host names are formatted in a dotted string format that comprises the diversity data.

18. The computer storage medium of claim 16, wherein the computer-executable instructions, when executed by the processor, cause the processor to perform operations further comprising:
detecting a failure of one of the plurality of virtual machines; and
in response to determining that a failed virtual machine should not be replaced, repairing the failed virtual machine.

19. The computer storage medium of claim 16, wherein the computer-executable instructions, when executed by the processor, cause the processor to perform operations further comprising:
detecting a failure of one of the plurality of virtual machines;
determining that a failed virtual machine should be replaced;
determining that enhanced redundancy is not to be provided for the failed virtual machine; and
replacing the failed virtual machine with a single new virtual machine.

20. The computer storage medium of claim 16, wherein the computer-executable instructions, when executed by the processor, cause the processor to perform operations further comprising:
detecting a failure of one of the plurality of virtual machines;
determining that a failed virtual machine should be replaced;
determining that enhanced redundancy is to be provided for the failed virtual machine;

determining a number of new virtual machines to be instantiated to provide the enhanced redundancy;
identifying a further pool of resources that are capable of providing needs associated with the new virtual machines;
identifying a most diverse group of the further pool of resources; and
triggering instantiation of the new virtual machines on the most diverse group of the further pool of resources.

\* \* \* \* \*